Sept. 16, 1958    L. G. GITZENDANNER    2,852,772
RECEIVER SCANNING SYSTEM
Filed Aug. 4, 1949    4 Sheets-Sheet 1

Inventor:
Louis G. Gitzendanner,
by Richard E. Hosley
His Attorney.

Sept. 16, 1958　　　L. G. GITZENDANNER　　　2,852,772
RECEIVER SCANNING SYSTEM

Filed Aug. 4, 1949　　　　　　　　　　　　　　4 Sheets-Sheet 2

Inventor:
Louis G. Gitzendanner,
by Richard E. Hosley
His Attorney.

Sept. 16, 1958     L. G. GITZENDANNER     2,852,772
RECEIVER SCANNING SYSTEM Filed Aug. 4, 1949                                              4 Sheets-Sheet 3

Fig. 5.

Inventor:
Louis G. Gitzendanner,
by Richard E. Hosley
His Attorney.

United States Patent Office 2,852,772
Patented Sept. 16, 1958

2,852,772

RECEIVER SCANNING SYSTEM

Louis G. Gitzendanner, Schenectady, N. Y., assignor to General Electric Company, a corporation of New York Application August 4, 1949, Serial No. 108,646

8 Claims. (Cl. 343—100)

My invention relates to object location systems, employing electromagnetic or compressional waves as the detecting medium. More particularly, my invention relates to object locations systems of the type employing "receiver scanning" wherein a transmitted wave is propagated throughout a wide sector, and the location of an object in that sector is determined by varying the direction of a narrow directional sensitivity pattern of an array of wave energy receiving elements to sweep through the sector in a known manner with time until an echo signal from the object is detected. This "receiver scanning" system may be contrasted with a "transmitter scanning" system wherein a moving narrow beam of transmitted wave energy is employed in conjunction with a receiver array having a stationary broad sensitivity pattern.

The conventional system of obtaining the scanning action of a directional receiving system is to propel the system mechanically about its axis so that its sensitivity pattern will move accordingly. While suitable for tracking moving objects once they are located, such mechanical propulsion systems are not adapted to move the sensitivity pattern at a high scanning frequency in order to provide an adequate coverage of a field which is appreciably larger than the sensitivity pattern. To be able to move the pattern rapidly is desirable since it increases the information obtainable in a given period of time thereby permitting the coverage of a wider field, an increased definition within a given field, and a higher rate of scanning across a field. One of the principal objects of my invention, therefore, is to provide a new method and apparatus whereby the direction of the sensitivity pattern of an array of receiving elements can be varied electrically to sweep throughout a predetermined sector at a high scanning frequency.

Another problem which is encountered in receiver scanning systems is the difficulty of propelling a single receiving array in more than one plane with the result that receiver scanning systems utilizing a single array of receiving elements usually provide directional information in only one dimension, such as the horizontal. In order to obtain an accurate bearing upon an object located within a sector of wide volume, however, it is evident that information upon the direction of the object should be provided with reference to at least two dimensions such as both its azimuth and its elevation. Another principal object of my invention, therefore, is to provide a new method and apparatus whereby a single array of receiving elements can be made to scan electrically throughout a sector of wide volume and to provide two dimensional bearing information.

In fulfillment of the above principal objects, it is a more specific object of my invention to provide a new method and apparatus whereby a directive sensitivity pattern of an array of reecriving elements can be made to rotate conically around a line normal to the plane of the array in a manner such that the apex of the cone is located at the array.

A still further specific object of my invention is to provide a new method and apparatus whereby the cone angle of a conically rotating directive sensitivity pattern of a receiving array can be varied electrically in a known manner with time to provide a spiral scanning action of the sensitivity pattern.

In general, my new method of obtaining receiver scanning is to arrange a plurality of receiving elements into a circular array and to displace the phase of the received signal voltage of each receiving element relative to the phase of the received voltage of one of the receiving elements as a reference by an increment proportional to the sine of the central angle formed between each receiving element and the element used as a reference. The directive sensitivity pattern of this circular array then appears at a particular angle outstanding from a line normal to the plane of the array, and this angle is dependent upon the amplitude of this sinusoidal phase displacement of the received signal voltages. In order to impart a rotational movement to this directive sensitivity pattern, the sinusoidal distribution of phase displacement of the received signal voltages is then made relative to each of the receiving elements in succession and the sensitivity pattern thus describes a cone with its apex at the array. If it is desired to scan the entire volume of a wide conical sector, the amplitude of this sinusoidal distribution of phase displacement is simply varied in a known manner with time to produce a spiral scanning action of the sensitivity pattern which entirely covers the sector.

Broadly stated, the particular embodiment of my invention herein illustrated and described comprehends a circular array of receiving elements having a directive sensitivity pattern normal to the plane thereof and a sonic delay line which is excited by an alternating voltage that is frequency modulated at a sinusoidal rate by a sine wave modulating voltage whose sonic wave length is equal to the length of the delay line. At any instant of time a sinusoidal distribution of the frequency modulated alternating voltages thereby appears along the length of the line. This delay line is tapped at longitudinally spaced points corresponding to the circumferential spacing between the receiving elements of the array. Heterodyning and integrating means are provided whereby the frequency modulated voltage at each of these tapped points is heterodyned with the signal received by its correspondingly spaced receiving element, and one of the resultant side band frequency components is integrated with a corresponding one of the resultant side band frequency components of all of the heterodyned voltages to produce the above described conical scan of the receiver sensitivity pattern.

The novel features which I believe to be characteristic of my invention are set forth with particularity in the appended claims. My invention itself, however, together with further objects and advantages thereof can best be understood by reference to the following description taken in connection with the accompanying drawings in which

Figure 1:
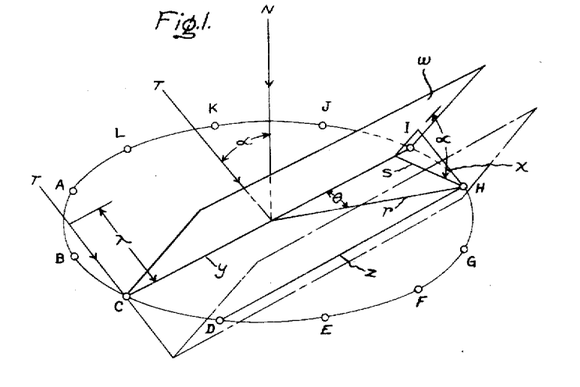
Fig. 1 is a diagrammatic perspective view of a circular array of compressional wave receiving elements illustrating the effect of an incident compressional wave.

My new method of obtaining receiver scanning can best be understood by referring to Fig. 1 in which I have diagrammatically illustrated the effect of an incident compressional wave upon a circular array of equally spaced compressional wave receiving elements A to L. The receiving elements A to L are arranged in the same plane whereby each element receives compressional wave energy incident upon the array of a field of view normal to the plane of the array and produces a signal voltage in response to such incident wave energy.

If a compressional wave having a wave length $\lambda$ is propagated toward the array from a distant source (not shown) at an angle $\alpha$ from a line N normal to the plane of the array, the wave front W appears as a plane surface which cuts successively positioned receiving elements as it passes through the array. In Fig. 1, the position of the wave front W is indicated as it passes from one of the receiving elements I to an adjacent element H. It is evident that in these two positions, the wave front W also cuts across elements C and D which are located on the lines of intersection $y$ and $z$ between the plane of the wave front W and the plane of the circular array.

Since the direction of propagation may be defined by any line T at an angle $\alpha$ from the normal N, the length of time that it takes for the wave front W to travel from element I to element H may be represented by the length of a line $x$ which is drawn parallel to the direction of propagation T and intermediate both positions of the wave front W. If the distance between the plane intersection lines $y$ and $z$ is represented by $s$, then the length of the line $x$ can be easily determined from the relation;

$$x = s \sin \alpha$$

However, the distance $s$ can also be expressed in terms of the central angle $\theta$ formed between elements I and H as follows:

$$s = r \sin \theta$$

where $r$ is the radius of the circle formed by the receiving elements.

Therefore, by substitution;

$$x = r \sin \theta \sin \alpha$$

It is well known in the art that the instantaneous voltage that is induced in a compressional wave receiving element by an incident compressional wave may be mathematically defined in terms of a voltage having both amplitude, which is determined by the magnitude of the wave front; and phase, which in turn is determined by the particular portion of the compressional wave cycle which happens to be cutting the receiving element at a particular instant. It is evident, therefore, that the voltages induced in adjacent elements such as elements I and H at any instant of time will be equal in amplitude but will differ in phase by an amount equal to the line $x$.

If the radius $r$ is expressed in terms of wave length $\lambda$, the phase displacement $\phi$ of the instantaneous voltage induced by the compressional wave between elements I and H can therefore be found from the relation $$\phi = \frac{2\pi}{\lambda} r \sin \theta \sin \alpha$$

where $$\frac{2\pi}{\lambda}$$

is the angular velocity of the compressional wave.

Furthermore, if the phase of the instantaneous voltage at any particular receiving element such as element C is considered as zero, then the instantaneous voltage E of the remaining receiving elements in the array is given by the polar equation $$E_i = A e^{j\frac{2\pi}{\lambda} r \sin \theta \sin \alpha}$$

where A is the amplitude of the voltage produced by the passage of the wave front, and $\theta$ is the central angle formed between element C and each receiving element respectively.

From the above equation, it can be easily seen that for an incident compressional wave from a given direction $\alpha$ the distribution of phase displacement of the voltages induced in a circular array of receiving elements at a particular instant of time is proportional to the sine of the central angle $\theta$. This is diagrammatically illustrated by Figs. 2 and 3.

Figure 2:
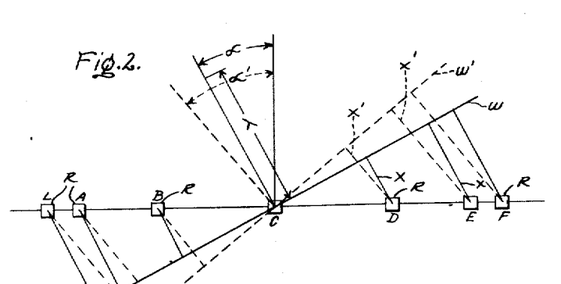
Fig. 2 is a side view of the array of Fig. 1 illustrating the phase displacement of the induced voltages in each of the receiving elements with respect to waves incident upon the array from two directions.

Referring to Fig. 2, I have plotted line $x$ with reference to two wave fronts W and W' passing through a central receiving element C from different directions defined by angles $\alpha$ and $\alpha'$. The surfaces R of the particular elements A through K illustrated are intended to be the surfaces on which compressional waves are incident. As explained above, lines $x$ and $x'$ represent the relative phase displacement of the voltage induced in each receiving element. It is evident that although this relative phase displacement is plotted for only ½ of the array, the remaining semi-circle of receiving elements will have a similar phase displacement relative to element C.

Figure 3:
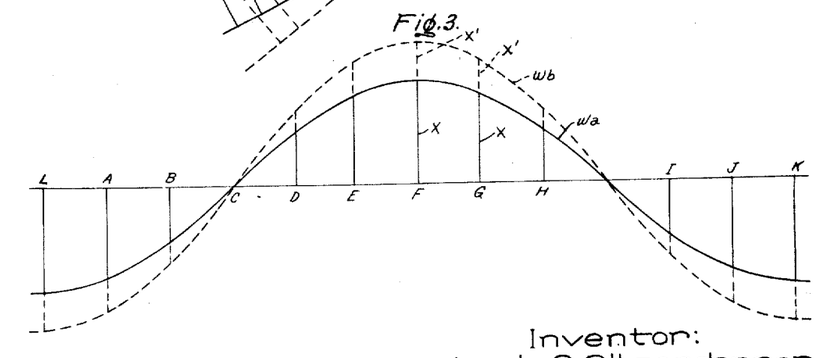
Fig. 3 is a graphical representation of the phase displacement of the voltage induced in the receiving elements of Fig. 2.

Referring to Fig. 3, I have plotted lines $x$ and $x'$ along a vertical axis as a function of the circumferential spacing between the circle of receiving elements A to L plotted at equally spaced points along a horizontal axis. It is evident from the shape of the resultant curves W$a$ and W$b$ which correspond to wave fronts W and W' of Fig. 2 that a sinusoidal distribution of phase displacement of the instantaneous voltage induced in each element results. In addition, it is evident from the relative amplitudes of curves W$a$ and W$b$ that the greater the directional angle $\alpha$, the greater will be the amplitude of this sinusoidal distribution of phase displacement.

It is well known in the art that the total voltage delivered by a circular array of receiving elements is maximum when a compressional wave is incident upon the array from a direction normal to the plane thereof. This can be easily appreciated from the fact that line $x$ is then equal to zero and the voltages induced in all of the receiving elements have the same phase. For compressional waves incident upon the array from a direction other than the normal thereto, the induced voltages are not in phase and the integrated voltage is much smaller; with the result that the circular array has a sensitivity pattern with maximum response to compressional waves that are propagated toward the array from a direction substantially normal to the plane of the array.

If, however, the voltages which are induced in all of the receiving elements can be made to have the same phase when a compressional wave is incident upon the array from a direction at an angle $\alpha$ from the normal to the array, then it is evident that the array will have a sensitivity pattern with greatest response to compressional waves that are propagated toward the array from a direction defined by that angle $\alpha$.

In order to cause the voltages induced in all of the receiving elements to be in phase when a compressional wave is incident upon the array at an angle $\alpha$, it will be appreciated that the phase of the voltage induced in each element must be changed by an amount equivalent to the phase displacement produced by this angular direction of the incident waves before integrating the voltages. As explained above, this means that the phase of the instantaneous voltage induced in each receiving element relative to the induced voltage of a given reference element must be displaced by an increment $x$ which is proportional to the sine of the central angle formed between that particular element and the reference element. Furthermore, if this sinusoidal distribution of phase displacement is made relative to each receiving element in succession, the sensitivity pattern of the array will rotate around the normal line N at an angle of incidence $\alpha$ outstanding therefrom.

Figure 4:
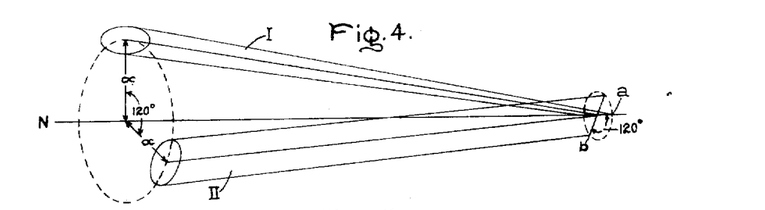
Fig. 4 is a perspective view illustrating the position of the directive senstivity pattern of the array as it moves conically about a line normal to the plane of the array.

This phenomena can be easily understood by referring to Fig. 4 in which I have diagrammatically illustrated the positions of the sensitivity pattern of a circular array when a sinusoidal distribution of phase displacement of the instantaneous induced voltages is made relative to two different receiving elements $a$ and $b$. The angular rotational displacement of the beam around the normal line N will be equal to the angular rotational displacement between the positions of elements $a$ and $b$, as illustrated in Fig. 4 for a rotational displacement of 120°. In addition, if the amplitude of this phase displacement is equal in both cases, the directive angle of incidence $\alpha$ will be the same for both positions of the sensitivity pattern, and a conical scanning action results.

As is well known in the art the actual shape of the sensitivity pattern of a circular array of receiving elements is determined primarily by the number of the receiving elements and by the ratio between the radius of the array and the wave length of the compressional wave. The greater this ratio, the more directive, i. e., the "narrower" will be the sensitivity pattern. For optimum operation of my invention, therefore, the number of receiving elements should be large and the radius of the circular array should be many wave lengths long.

As explained previously, the directive angle of incidence $\alpha$ is determined by the amplitude of the sinusoidal distribution of phase displacement of the instantaneous induced voltages around the circular array. Therefore, by varying the amplitude of this phase displacement coincidentally with a constant variation of the reference point from one receiving element to the next succeeding element around the array, the sensitivity pattern can be made to rotate in the form of a spiral; and thereby to scan the entire volume of a wide conical sector.

Since the direction of the sensitivity pattern of the array at any instant of time is a function of the position of the reference receiving element and the amplitude of this sinusoidal distribution of phase displacement, both of which are determinable parameters; this instantaneous position of the sensitivity pattern can easily be correlated in a proper direction indicating device, such as an oscilloscope, to give immediate two-dimensional indication of the direction of a received signal.

Figure 5:
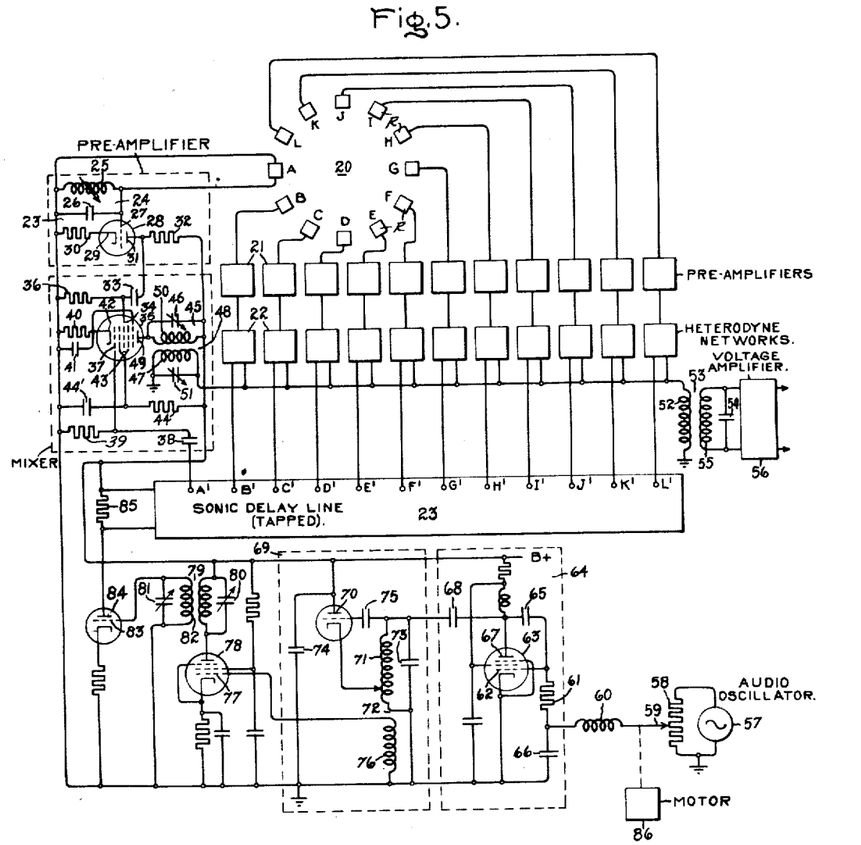
Fig. 5 is a schematic diagram of one embodiment of my invention.

One embodiment of my new method of obtaining the spiral scanning action of an array of receiving elements is illustrated in the schematic diagram of Fig. 5. A plurality of compressional wave receiving elements A to L, such as 45° Y-cut Rochele Salt crystal elements, are arranged in the same plane to form a circular array 20. These receiving elements A to L have their energy receiving surfaces R all facing in the same general direction (a direction normal to the plane of the page, i. e., the plane of the array) and are preferably equally spaced around the circumference of the circle. As explained above, a circular array of this type is adapted to receive wave energy from a field of view substantially normal to the plane of the array and will have a sensitivity pattern having maximum response to an incident wave from a direction perpendicular to the plane thereof. Each of the receiving elements A to L are connected through a separate heterodyning channel comprising a conventional preamplifier stage 21 and a heterodyning network 22 to one of a plurality of tapped points A' to L' on a sonic delay line 23 which corresponds in spacing to the circumferential position of the particular receiving element. If the receiving elements A to L are equally spaced, it is evident that the tapped points A' to L' on delay line 23 will also be equally spaced as illustrated.

The circuit diagram of one of these channels is shown in conjunction with one of the crystal elements A. The crystal element A is connected across a resonant circuit 24 comprising a variable inductance 25 and a capacitor 26 which is connected in parallel with inductance 25. One end of the resonant circuit 24 is grounded while the other end is connected to a control grid 27 of a triode vacuum tube 28. A cathode 29 of tube 28 is connected through a biasing resistor 30 to ground while the anode 31 is connected through a load resistor 32 to a source of high potential B+, to form a conventional voltage amplification network.

The voltage at anode 31 is fed through a coupling capacitor 33 to an injector grid 34 of a conventional converter tube 35. A direct current return resistor 36 is, of course, connected from the injector grid 34 to ground. A control grid 37 of tube 35 is coupled by a capacitor 38 to the tapped point A' on the delay line 23 which corresponds to the position of element A. Another direct current return resistor 39 is connected from this control grid 37 to ground. The proper direct current operating level for tube 35 is maintained by virtue of a biasing resistor 40 and a by-pass capacitor 41 connected from a cathode 42 to ground; and a proper high potential is maintained on a screen grid 43 of tube 35 through a voltage dropping resistor 44 connected from the screen grid 43 to B+, and through a by-pass capacitor 44' connected from the screen grid 43 to ground.

The output voltage produced by this heterodyning network is developed across a resonant circuit 45 comprising a variable capacitor 46 and a primary winding 50 of a transformer 48 connected in parallel from an anode 49 of tube 35 to B+. The secondary winding 47 of transformer 48 is also preferably tuned by a variable capacitor 51 connected thereacross. One end of this secondary winding 47 is grounded while the other end is connected to a primary winding 52 of an integrating transformer 53. As indicated in Fig. 5, the output of each heterodyning channel is also connected to this same primary winding 52 of integrating transformer 53. A capacitor 54 is connected across a secondary winding 55 of the integrating transformer 53, and the voltage induced in this secondary winding 55 is coupled through a conventional voltage amplifier designated as block 56 to a proper signal indicating device (not shown).

The remainder of the circuit of Fig. 5 provides the proper excitation voltage for the sonic delay line 23. The sinusoidal output voltage of a low frequency oscillator 57 is connected across a potentiometer 58. The frequency of this oscillator 57 is adjusted so that the sonic wave length of its sinusoidal output voltage is equal to the actual length of the delay line 23.

The voltage produced at a movable arm 59 of potentiometer 58 is fed through a radio frequency choke 60 and a resistor 61 to a grid 62 of a pentode tube 63 connected as a conventional reactance modulator network 64. A capacitor 65, resistor 61 and a capacitor 66 connected in series from an anode 67 of tube 63 to ground provide the requisite phase shifting network. The anode 67 is also connected through a direct current blocking capacitor 68 to the resonating circuit of a conventional high frequency Hartley oscillator 69 comprising a triode tube 70, a tapped primary winding 71 of a transformer 72, a tuning capacitor 73 and direct current blocking capacitors 74 and 75. As is well known in the art, the output of the reactance modulator network 60 functions to modulate the frequency of the Hartley oscillator 69 by an amount determined by the amplitude of the alternating voltage applied to the grid 62 of the reactance tube 63.

The voltage induced in a secondary winding 76 of transformer 72 is directly coupled to a grid 77 of a pentode tube 78 connected as a conventional buffer amplifier. A transformer 79 in the output circuit of tube 78 is preferably tuned by capacitors 80 and 81 to the second harmonic of the mid-frequency of the Hartley oscillator 69, thereby to function as a frequency doubler. The secondary winding 82 of transformer 79 is directly connected to a control grid 83 of a triode tube 84 which is connected as a conventional power amplifier. The output voltage of this power amplifier network is developed across an output load resistor 85, and is connected to excite the delay line 23 as illustrated.

In order to vary the amplitude of the sinusoidal voltage applied to the grid 62 of the reactance tube 63, a motor 86 may be mechanically fastened to the movable arm 59 of potentiometer 58 to cause the movable arm 59 to oscillate from one end of potentiometer 58 to its other end in a known manner with time.

Figure 6:
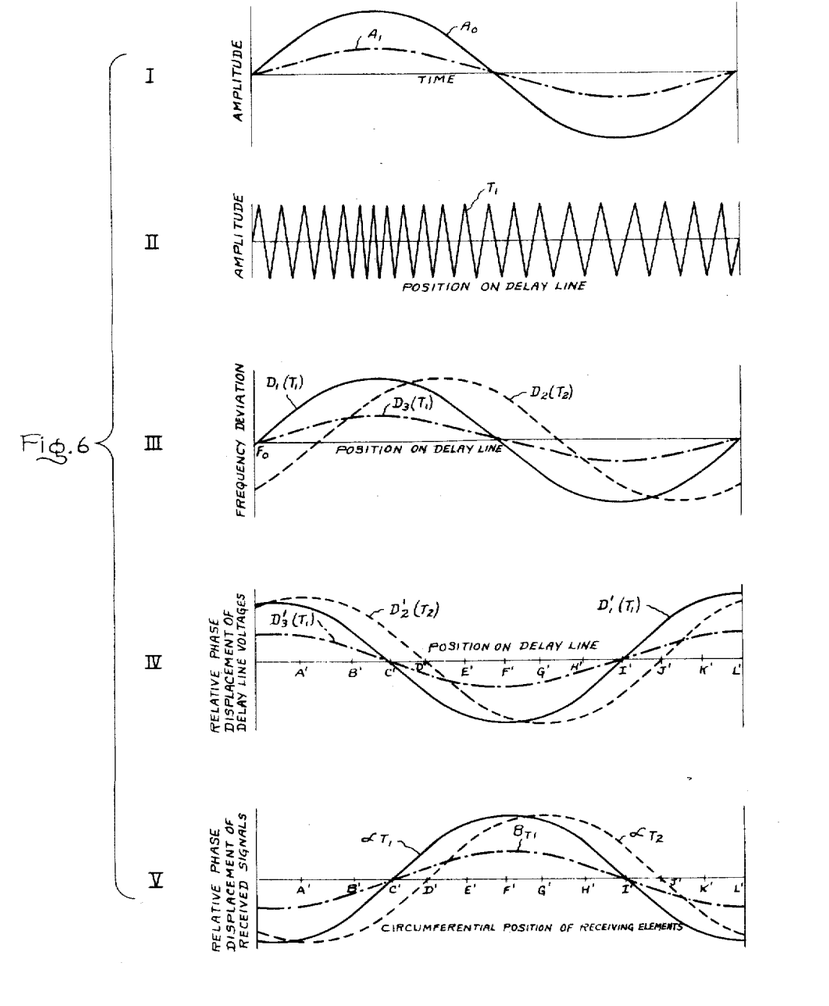
Fig. 6 is a group of curves illustrating various alternating voltages present in the circuit of Fig. 5.

The operation of embodiment of my invention herein illustrated and described can best be understood by considering the instantaneous alternating voltages that are produced at various points in the circuit of Fig. 5 under specified conditions. Referring to Fig. 6, I have plotted in scale I the amplitude of the sinusoidal voltage output of the low frequency oscillator as applied to the grid 62 of the tube 63 for two positions of the movable arm of potentiometer 58 as a function of time. Curve $A_0$ represents the voltage produced with the movable arm 59 near the ungrounded end of potentiometer 58 and curve $A_1$ represents the voltage produced with the arm near the grounded end of potentiometer 58.

The voltage developed at the anode 67 of the reactance tube 63 is shifted in phase by the well known acction of the phase shifting network, comprising elements 65, 61 and 66, in accordance with the variation in the amplitude of this applied grid voltage. This phase modulated anode voltage is applied through capacitor 68 to the resonant circuit of the higher frequency oscillator 69 and functions to modulate the frequency of this high frequency oscillator output voltage accordingly. Since the amplitude of the voltage applied to the grid 62 of reactance tube 63 from low frequency oscillator 57 is sinusoidal, the frequency modulation of the output voltage of the high frequency oscillator 69 is also sinusoidal in character. Furthermore, the amplitude of the sinusoidal voltage applied to the grid 62 of reactance tube 63 as determined by the position of the movable arm 59 of potentiometer 58 in turn determines the amount of frequency deviation from the mid-frequency output voltage of the high frequency oscillator.

The frequency modulated output voltage of the high frequency oscillator 69 is applied through transformer 72 to the grid 77 of tube 78 which is connected as a conventional buffer amplifier. The output transformer 79 of this buffer amplifier stage may be broadly tuned to a harmonic of the input mid-frequency voltage to function also as a frequency converting network.

The voltage produced across the secondary winding 82 of transformer 79 is applied to the grid 83 of power amplifier tube 84 and the voltage developed across load resistor 85 is connected to excite the sonic delay line 23.

The exciting voltage developed across load resistor 85 is merely the amplified voltage output of the high frequency oscillator and is, therefore, an alternating voltage that is frequency modulated sinusoidally at a rate determined by the frequency of the low frequency oscillator 57, and with a frequency deviation determined by the position of the movable arm 59 of potentiometer 58. If the frequency of the sinusoidal output voltage of the low frequency oscillator 58 is adjusted so that it wave length when traveling through the material from which the sonic delay is constructed is exactly equal to the length of the line, then one complete cycle of frequency modulation occurs from one end of the delay line to its other end.

In scale II, I have diagrammatically illustrated in wave form the frequency modulated voltage produced at various points along the delay line for a particular instant of time $T_1$ when excited by the voltage developed across load resistor 85. The frequency deviation of this alternating voltage along the delay line 23 with respect to a midfrequency $F_0$ is shown in scale III as curve $D_1$ for an instant of time $T_1$ when the amplitude of the sinusoidal voltage applied to grid 62 of reactance tube 63 is as designated by curve $A_0$ in scale I. Curve $D_2$ in scale III is a similar curve of the distribution of the frequency deviation along the delay line 23 for an instant of time $T_2$ a moment after time $T_1$ and illustrates that the point of zero deviation travels down the delay line at a velocity equal to the velocity of propagation of a compressional wave in the particular delay line employed. Curve $D_3$ of scale III illustrates the frequency deviation resulting along the delay line from a sinusoidal voltage applied to grid 62 equal to the amplitude of sine curve $A_1$ in scale I and illustrates that the frequency deviation is proportional to the amplitude of the voltage applied to the grid 62 of tube 63.

The relative phase displacement along the delay line of the frequency modulated voltages of scale III is shown in scale IV and designated by similar letters $D_1'$, $D_2'$ and $D_3'$ in order to indicate the corresponding relationship between the various curves in each scale. It is obvious from the curves $D_1'$ and $D_2'$ of scale IV that the sinusoidal phase displacement of the alternating voltage along the delay line is relative to point $C'$ at time $T_1$, but is relative to point $D'$ a moment $T_2$ later as this relative phase displacement travels down the delay line. There is, therefore, produced along the length of the delay line a plurality of alternating voltages sinusoidally displaced in phase relative to a point traveling down the line at a velocity determined by the velocity of propagation of a compressional wave in the material from which the particular delay line is constructed. If the movable arm 59 is oscillated by motor 86 back and forth over the face of potentiometer 58, the amplitude of this sinusoidal phase displacement of the voltages traveling down the delay line will coincidentally vary from zero to a maximum value.

It will be appreciated, therefore, that by tapping the delay line 23 at points $A'$ to $L'$ along its longitudinal axis corresponding to the circumferential spacing of a circular array of receiving elements $A$ to $L$, voltages are thus produced which have the same phase relation as the voltages which are induced in the receiving elements of the array by the passage of an incident compressional wave from a determinable direction.

Figure 7:
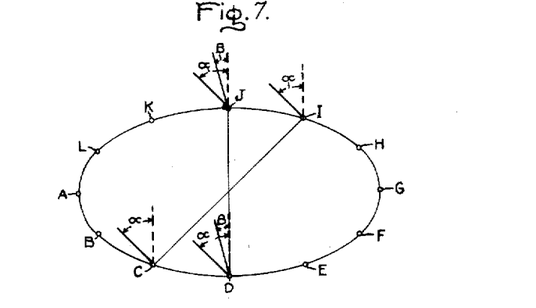
Fig. 7 is a diagrammatic view of a circular array of receiving elements useful in the explanation of the curves of Fig. 6.

This phenomena is illustrated by scale V taken in conjunction with Fig. 7. If a compressional wave is incident upon the array of receiving elements $A$ to $L$ from an angle $\alpha$ at a particular instant of time $T_1$, the curve $\alpha T_1$ of phase displacement of instantaneous voltage relative to element $C$ results. A moment later the curve $\alpha T_3$ relative to element $D$ is produced. If the direction of the compressional wave at time $T_1$ is defined by the angle $B$, the curve $BT_1$ of relative phase displacement results.

It will be appreciated that these three curves of phase displacement illustrated in scale V are the exact counterpart of the curves of phase displacement produced by the delay line as illustrated in scale IV, but 180° out-of-phase therewith. Furthermore, it is evident that if the phase of the voltage induced in each receiving element $A$ to $L$ when a compressional wave is incident upon the array from an angle $\alpha$ at a time $T_1$ were displaced by an amount equal to the phase of the voltage produced at the corresponding points $A'$ to $L'$ on the delay line 23 as designated by curve $D_1'$, all of the voltages induced in the receiving array would be in phase, and the array would have maximum sensitivity to a compressional wave from an elevational direction defined by the angle of incidence $\alpha$ and from a rotational direction determinable from the position of the reference element C. Similarly, if the phase of the instantaneous induced voltage of each receiving element A to L were displaced by an amount equal to the phase of the voltage at corresponding points along the delay line as designated by curve $D_2'$, the receiving array would have maximum sensitivity to an incident compressional wave from an elevational angle $\alpha$ but from a rotational direction determined by the element D. Furthermore, if the phase of the voltage of each receiving element A to L were displaced by an increment equal to the phase of the voltage at corresponding points along the delay line as designated by curve $D_3'$, the receiving array would have maximum sensitivity to an incident compressional wave from a direction having rotational angle determined by element C but an elevational angle equal to angle B.

The method by which I accomplish this phase displacement of the voltage induced in the receiving elements A to L in accordance with the sinusoidal phase displacement of the voltages at points A' to L' along the delay line is to heterodyne the voltage induced in each receiving element A to L with the voltage at a corresponding point A' to L' on the delay line and to filter one of the resultant side band frequency components of each heterodyned network. If the sum frequency components are filtered, each resultant voltage will have a phase angle equal to the sum of the phase angles of the individual heterodyned voltages; and conversely if the difference frequency components are filtered, each resultant voltage will have a phase angle equal to the difference of the original heterodyned voltages.

This phenomena is mathematically demonstrated by the following analysis. The voltage induced in receiving element A as plotted in scale V for an incident compressional wave from an angle $\alpha$ at time $T_1$ is equal to $$E_A = E_C \sin (W_r t - \phi)$$

where $E_c$ is the amplitude of the alternating voltage and the remainder of the expression is its phase angle; $W_r t$ defines the frequency of the incident compressional wave and $\phi$ represents the phase displacement relative to the phase of the voltage induced at element C.

The voltage produced at point A' on the delay line as indicated by curve $D_1$ is equal to $$E_{A'} = E_{C'} \sin (W_k t + \phi')$$

where $E_c'$ is the amplitude of the alternating voltage, $W_k t$ defines the mid-frequency of the exciting frequency modulated voltage, and $\phi'$ represents its phase displacement relative to point C'.

If these two voltages are heterodyned, the sum frequency component $e_m$ is proportional to $$E_m \simeq E_c E_{c'} \sin (W_r t + W_k t - \phi + \phi')$$

where $E_c E_{c'}$ is the amplitude of the resultant alternating voltage; $(W_r t + W_k t)$ defines its sum frequency component, and $(-\phi + \phi')$ indicates its relative phase displacement. It will be appreciated from the above that if $\phi$ is equal to $\phi'$ there will be no relative phase displacement of the resultant voltage.

Referring again to Fig. 5, I have illustrated in conjunction with receiving element A and point A' on the delay line one embodiment of my invention whereby this heterodyning process may be accomplished. The voltage induced in element A is developed across the variable inductance 25 tuned by capacitor 26 to the frequency of the incident compressional wave. This voltage is amplified by tube 31 and applied through coupling capacitor 33 to the injector grid 34 of converter tube 35. The frequency modulated voltage produced at point A' of the delay line is directly coupled through capacitor 38 to the control grid 31 of the same converter tube 35. Both of these voltages are heterodyned in a well known manner by the action of converter tube 35 to produce an alternating current through the output transformer 45 which contains their sum and difference frequency components, commonly referred to as their "side band" frequency components. The transformer 48 is broadly tuned by capacitors 46 and 51 to one of these side band frequency components, such as the sum of the frequency of the incident compressional wave and the mid-frequency of the frequency modulated delay line excitation voltage, and thereby functions to filter this side band frequency component from the remaining components of the heterodyned voltages. This side band frequency component appearing across the secondary of transformer 48 is fed together with similar outputs from each heterodyning channel to the primary of the integrating transformer 53 whose secondary winding 55 is also preferably broadly tuned by capacitor 54 to resonate at this side band frequency. The output of this integrating transformer 53 is amplified by a conventional voltage amplifier 56 and applied to a signal indicating device (not shown).

It is obvious that the output of this integrating transformer 53 will be maximum whenever the voltages delivered thereto from each channel all have the same phase. As explained above, this total in-phase condition will result when a compressional wave is incident upon the array from an elevational direction determined by the amplitude of the sinusoidal phase distribution of voltage along the delay line and from a rotational direction determined by the relative position of this sinusoidal phase distribution as it travels down the line. Since the amplitude of the sinusoidal distribution of phase displacement is a function of the position of the movable arm 59 of potentiometer 58, and since the position of this sinusoidal phase distribution along the delay line is a function of the instantaneous voltage across potentiometer 58, it is a simple matter for those skilled in the art to utilize these two determinable parameters to synchronize the movement of the resultant sensitivity pattern of the receiving array 20 to the movement of a proper signal indicating device. For example, a voltage proportional to the movement of arm 59 could be combined with the voltage developed across potentiometer 58 and applied to the deflection plates of a cathode ray tube to cause the electron beam to be deflected in the form of a spiral which is synchronized to the spiral scanning action of the receiving array 20.

It will be appreciated from the foregoing explanation that the rotational scanning frequency is a function of the length of the sonic delay line. If the length of the delay line is increased, the frequency of the low frequency oscillator 57 must be reduced since its sonic wave length must be equal to the length of the delay line for proper operation of my invention. Consequently, the length of time that elapses while the sinusoidal distribution of phase displacement travels down the line is correspondingly increased and a slower scanning action results.

It will also be apparent to those skilled in the art that the direction of rotation of the receiver sensitivity pattern is determined by the direction of wave propagation down the delay line and by the sequence in which the receiving elements are connected thereto.

Figure 8:
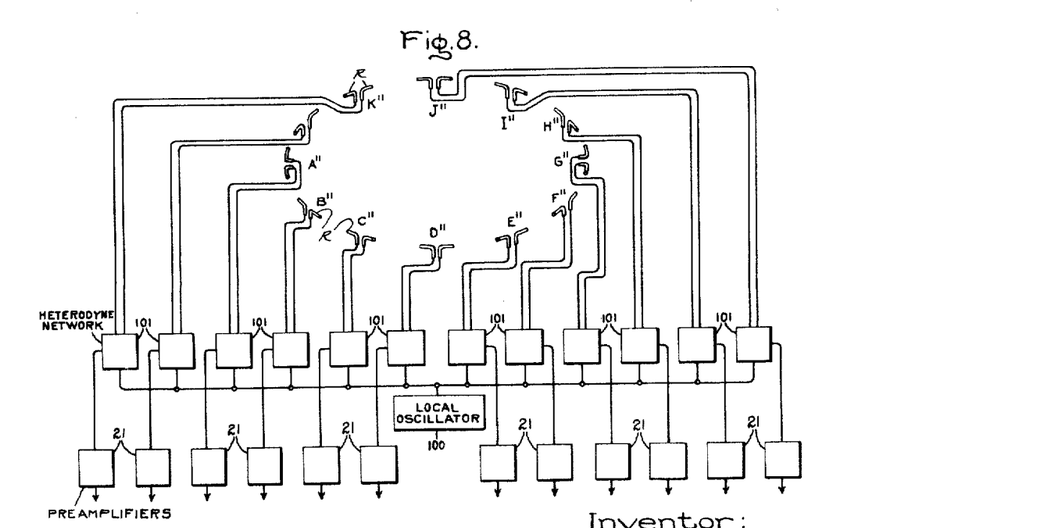
Fig. 8 is a modification of my invention illustrating one manner in which my invention may be adapted for use with electromagnetic waves.

Referring now to Figure 8, I have shown in block diagram a modification of my invention whereby it may be adapted for use in object location systems employing electromagnetic waves. As is well known, such systems commonly employ electromagnetic waves of ultra high frequency in the neighborhood, for example, of 3,000 megacycles. However, due to the great difference in their relative velocities of propagation, the wave length of such high frequency electromagnetic waves are comparable to the wave length of the much lower frequency compressionable waves, and they follow analogous laws of propagation.

In Figure 8 a group of ultra high frequency electromagnetic wave receiving elements such as dipoles A" to L" are arranged in a circle in the same manner as the compressional wave receiving elements A to L. The upper portions of the dipoles A" to L" constitute their energy-receiving surfaces R, and all of the dipoles are arranged to have their energy-receiving surfaces facing in the same general direction normal to the plane of the array. Because of the difficulty of constructing stable and efficient electronic circuits to operate at the ultra high frequency of such transmitted electromagnetic waves, the signal produced by these dipoles is converted to a more convenient lower frequency by heterodying the output of each dipole with the output of the same local oscillator designated by block 100. The heterodyning networks are indicated in Figure 8 as blocks 101. As is well known in the art, heterodyned output signals in the order of 15 or 30 megacycles are easily obtainable by such networks. These lower frequency heterodyned output signals are then applied to the preamplifiers 21 of the circuit of Figure 6 in the same manner as the output of the compressionable wave receiving elements A to L.

As explained previously, the phase of the output of each heterodyne network 101 is a function of the phase of the voltage applied from the local oscillator 100 combined with the phase of the signal voltage from an associated dipole A" to L". Since the same local oscillator 100 feeds all of the heterodyning networks 101, the phase relations existing between the high frequency received signals will be reproduced in the lower frequency heterodyned output and may be applied in the same manner as the lower frequency signals applied from the compressional wave receiving elements A to L.

I have thus provided a receiver scanning system which fulfills the objects of my invention as previously set forth. The direction of the receiver sensitivity pattern is varied by completely electric means to sweep through a wide field. The movement of the sensitivity pattern can easily be correlated to a signal indicating device to give immediate two-dimensional indication of the direction of a received signal. And, more specifically a spiral scanning action of a circular array of compressional wave receiving elements is produced by electric means to sweep through the entire volume of a wide conical sector.

While I have shown a particular embodiment of my invention, it is to be understood that I do not wish to be limited thereto since many modifications may be made, and I, therefore, contemplate by the appended claims to cover all such modifications as fall within the true spirit and scope of my invention.

What I claim as new and desire to secure by Letters Patent of the United States is:

1. In a compressional wave receiving system, a circular array of compressional wave receiving elements adapted to produce signal voltages responsive to incident compressional waves, said receiving elements being arranged in the same plane to receive compressional waves from a field of view extending a direction substantially normal to said plane, said array having a directive sensitivity pattern, and electronic means to produce a spiral scanning action of said sensitivity pattern throughout a wide sectior comprising, a sonic delay line tapped at longitudinally spaced points proportional in spacing to the circumferential spacing between said receiving elements, means to generate a frequency modulated alternating voltage, said alternating voltage being frequency modulated by a cycle of sinusoidal frequency modulating voltage whose sonic wave length is equal to the length of said delay line, means to vary the amplitude of said sinusoidal frequency modulating cycle, means to excite said sonic delay line with said frequency modulated alternating voltage thereby to cause a sinusoidal distribution of relative phase displacement of instantaneous voltages travelling down said delay line with varying amplitude, means to heterodyne the voltage at each of said tapped points with the voltage produced by the correspondingly spaced one of said receiving elements thereby to produce a heterodyned voltage having side band frequency components, and integrating means connected to receive each of said heterodyned voltages but responsive only to one of said side band frequency components.

2. In an electromagnetic wave receiving system, a circular array of ultra high frequency electromagnetic wave receiving elements adapted to produce signal voltages responsive to incident electromagnetic waves said receiving elements being arranged in the same plane to receive waves from a field of view extending in a direction substantially normal to said plane, said array having a directive sensitivity pattern, means to generate an ultra high frequency voltage adjacent in frequency to the frequency of said incident electromagnetic wave, means to heterodyne the voltage produced by each of said receiving elements with the output voltage of said generated ultra high frequency voltage thereby to produce a plurality of lower frequency signal voltages, and electronic means to produce a spiral scanning action of said sensitivity pattern comprising, a sonic delay line tapped at longitudinally spaced points proportional in spacing to the circumferential spacing between said receiving elements, means to generate a frequency modulated alternating voltage, said alternating voltage being frequency modulated by a cycle of sinusoidal frequency modulating voltage whose sonic wave length is equal to the length of said delay line, means to vary the amplitude of said sinusoidal frequency modulating cycle, means to excite said sonic delay line with said frequency modulated alternating voltage thereby to cause a sinusoidal distribution of relative phase displacement of instantaneous voltages travelling down said delay line with varying amplitude, means to heterodyne the voltage at each of said tapped points with the voltage produced by the correspondingly spaced one of said receiving elements thereby to produce a heterodyned voltage having side band frequency components, and integrating means connected to receive each of said heterodyned voltages but responsive only to one of said side band frequency components.

3. In a wave energy receiving system, a circular array of spaced wave energy receiving elements arranged in the same plane to produce signal voltages proportional to incident waves received from a field of view substantially normal to said array, means for generating an alternating voltage frequency modulated in accord with a sine wave, phase delay means connected to receive said frequency modulated voltage and constructed to provide in response thereto a plurality of identical frequency modulated voltages each successively delayed in phase by phase increments proportional to the circumferential spacing between successive positioned elements and totaling to the period of said sine wave, and means for heterodyning each successively phase delayed frequency modulated voltage with the signal voltage produced by a correspondingly positioned one of said elements.

4. In a wave energy receiving system, a circular array of spaced wave energy receiving elements arranged in the same plane to produce signal voltages proportional to incident waves received from a field of view substantially normal to said array, means for generating an alternating voltage frequency modulated in accord with a sine wave, means for varying the amplitude of said sine wave frequency modulation of said alternating voltage, phase delay means connected to receive said frequency modulated voltage and constructed to provide in response thereto a plurality of identical frequency modulated voltages each successively delayed in phase by phase increments proportional to the circumferential spacing between successively positioned elements and totaling to the period of said sine wave, and means for heterodyning each successively phase delayed frequency modulated voltage with the signal voltage produced by a correspondingly positioned one of said elements.

5. The method of producing electrically a spiral scanning action of an array of wave energy receiving elements adapted to produce signal voltages responsive to incident waves, which method comprises arranging said receiving elements to form a circle of equally spaced elements responsive to incident compressional waves from a direction normal to the plane of the circular array thus formed so that the integral of signal voltages produced by the elements is maximum when a wave is received from this normal direction, generating a plurality of alternating voltages having identical sinusoidal frequency modulation but successively shifted in phase by equal phase increments, varying simultaneously the amplitude of the sinusoidal frequency modulation of the generated alternating voltages, and heterodyning each successive phase shifted frequency modulated voltage with the signal voltage produced by a successively positioned one of the elements.

6. The method of producing electrically a spiral scanning action of a propagated wave energy receiving system which method comprises, arranging a plurality of receiving elements adapted to produce signal voltages responsive to incident waves to form a circle responsive to incident waves in a direction normal to the plane of this circle, generating a plurality of alternating voltages identically modulated in frequency in accord with a sine wave but successively shifted in phase by phase increments proportional to the circumferential spacing between successively positioned elements around the array and totaling in phase shift to the period of the sine wave of frequency modulation, varying the amplitude of the sinusoidal frequency modulation of the generated voltages, heterodyning each successively phase-shifted frequency-modulated voltage with the signal voltage produced by a correspondingly positioned one of the receiving elements, filtering the same one of the heterodyned side band frequency components from each of the heterodyned voltages, and integrating all of the filtered side band components.

7. In a wave energy receiving system, a circular array of wave energy receiving elements arranged in the same plane to produce signal voltages proportional to incident waves received from a same field of view substantially normal to said array, means for generating an alternating voltage frequency modulated in accord with a sine wave, phase delay means connected to receive said frequency modulated voltage and constructed to provide in response thereto a plurality of identical frequency modulated voltages each successively delayed in phase by phase increments proportional to the circumferential spacing between successively positioned elements, said phase increments totaling the period of said sine wave, means for heterodyning each successively phase-delayed frequency-modulated voltage with the signal voltage produced by a correspondingly positioned one of said elements to produce a plurality of heterodyned voltages having side band frequency components, and integrating means connected to receive each of said heterodyned voltages but responsive only to one of the side band frequency components thereof.

8. In a wave energy receiving system, a circular array of wave energy receiving elements arranged in the same plane to produce signal voltages proportional to incident waves received from a same field of view substantially normal to said array, means for generating an alternating voltage frequency modulated in accord with a sine wave, means for varying the amplitude of said sine wave frequency modulation of said alternating voltage, phase delay means connected to receive said frequency modulated voltage and constructed to provide in response thereto a plurality of identical frequency modulated voltages each successively delayed in phase by phase increments proportional to the circumferential spacing between successively positioned elements, said phase increments totaling to the period of said sine wave, means for heterodyning each successively phase-delayed frequency-modulated voltage with the signal voltage produced by a correspondingly positioned one of said elements to produce a plurality of heterodyned voltages having side band frequency components, and integrating means connected to receive each of said heterodyned voltages but responsive only to one of the side band frequency components thereof.

References Cited in the file of this patent

UNITED STATES PATENTS

| | | |
|---|---|---|
| 1,893,741 | Hecht et al. | Jan. 10, 1933 |
| 1,901,342 | Lamson | Mar. 14, 1933 |
| 1,969,005 | Hecht | Aug. 7, 1934 |
| 1,977,974 | Rudolph | Oct. 23, 1934 |
| 2,140,130 | Earp | Dec. 13, 1938 |
| 2,245,660 | Feldman et al. | June 17, 1941 |
| 2,247,666 | Potter | July 1, 1941 |
| 2,406,953 | Lewis | Sept. 3, 1946 |
| 2,409,944 | Loughren | Oct. 22, 1946 |
| 2,430,296 | Lewis | Nov. 7, 1947 |
| 2,432,134 | Bagnall | Dec. 9, 1947 |
| 2,437,281 | Tawney | Mar. 9, 1948 |
| 2,444,425 | Busignies | July 6, 1948 |
| 2,464,276 | Varian | Mar. 15, 1949 |
| 2,466,354 | Bagnall | Apr. 5, 1949 |
| 2,592,738 | Rich | Apr. 15, 1952 |

UNITED STATES PATENT OFFICE
CERTIFICATE OF CORRECTION

Patent No. 2,852,772                                                September 16, 1958

Louis G. Gitzendanner

It is hereby certified that error appears in the printed specification of the above numbered patent requiring correction and that the said Letters Patent should read as corrected below.

Column 11, line 56, after "extending" insert -- in --; column 12, line 53, and column 13, line 15, for "successive", each occurrence, read -- successively --.

Signed and sealed this 2nd day of December 1958.

(SEAL)
Attest:

KARL H. AXLINE
Attesting Officer

ROBERT C. WATSON
Commissioner of Patents